US007912035B1

United States Patent
Leung et al.

(12) United States Patent
(10) Patent No.: US 7,912,035 B1
(45) Date of Patent: Mar. 22, 2011

(54) COMMUNICATING PACKETS USING A HOME ANCHORED BEARER PATH OR A VISITED ANCHORED BEARER PATH

(75) Inventors: Kent K. Leung, Los Altos, CA (US); Parviz Yegani, Danville, CA (US); Flemming S. Andreasen, Marlboro, NJ (US); Timothy P. Stammers, Raleigh, NC (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 11/715,033

(22) Filed: Mar. 6, 2007

Related U.S. Application Data

(60) Provisional application No. 60/780,176, filed on Mar. 6, 2006.

(51) Int. Cl.
*H04L 12/28* (2006.01)
*H04W 4/00* (2009.01)
*G06F 15/16* (2006.01)

(52) U.S. Cl. ............... 370/351; 709/228; 455/432.1; 370/328; 370/338

(58) Field of Classification Search ............... 370/349, 370/401, 392, 351–356, 328, 338; 455/435.1, 455/432.1, 414.1; 709/245, 238, 228
See application file for complete search history.

(56) References Cited

U.S. PATENT DOCUMENTS

| | | | |
|---|---|---|---|
| 5,602,907 A | 2/1997 | Hata et al. | 379/114 |
| 5,822,411 A | 10/1998 | Swale et al. | 379/111 |
| 5,828,737 A | 10/1998 | Sawyer | 379/114 |
| 5,905,736 A | 5/1999 | Ronen et al. | 370/546 |
| 5,909,238 A | 6/1999 | Nagashima et al. | 348/3 |
| 5,946,670 A | 8/1999 | Motohashi et al. | 705/400 |
| 5,956,391 A | 9/1999 | Melen et al. | 379/114 |
| 5,970,477 A | 10/1999 | Roden | 705/32 |
| 5,987,498 A | 11/1999 | Athing et al. | 709/203 |
| 6,016,509 A | 1/2000 | Dedrick | 709/224 |
| 6,035,281 A | 3/2000 | Crosskey et al. | 705/14 |
| 6,047,051 A | 4/2000 | Ginzboorg et al. | 379/130 |
| 6,070,192 A | 5/2000 | Holt et al. | 709/227 |

(Continued)

FOREIGN PATENT DOCUMENTS

WO WO 98/26381 6/1998

(Continued)

OTHER PUBLICATIONS

Online Inc., "Apogee Releases Content Usage-Based Billing Product Annotated Title—Software allows content usage-based billing," EContent, vol. 24, No. 5, NDN 173-0356-6509-7, 1 pg, Jul. 2001.

(Continued)

*Primary Examiner* — Ahmad F Matar
*Assistant Examiner* — Sonia Gay
(74) *Attorney, Agent, or Firm* — Baker Botts L.L.P.

(57) ABSTRACT

Communicating packets along a bearer path includes providing a home network address and a visited network address to an access terminal. The home network address corresponds to a home anchored bearer path anchored at a home network of the access terminal, and the visited network address corresponds to a visited anchored bearer path anchored at a visited network. Packets are received from the access terminal. The packets are communicated along the home anchored bearer path if the packets use the home network address. The packets are communicated along the visited anchored bearer path if packets use the visited network address.

20 Claims, 4 Drawing Sheets

U.S. PATENT DOCUMENTS

| | | | | |
|---|---|---|---|---|
| 6,075,854 | A | 6/2000 | Copley et al. | 379/211 |
| 6,131,024 | A | 10/2000 | Boltz | 455/405 |
| 6,137,791 | A | 10/2000 | Frid et al. | 370/352 |
| 6,141,684 | A | 10/2000 | McDonald et al. | 709/222 |
| 6,175,879 | B1 | 1/2001 | Shah et al. | 709/330 |
| 6,208,977 | B1 | 3/2001 | Hernandez et al. | 705/34 |
| 6,229,887 | B1 | 5/2001 | Albers et al. | 379/219 |
| 6,282,573 | B1 | 8/2001 | Darago et al. | 709/229 |
| 6,295,447 | B1 | 9/2001 | Reichelt et al. | 455/417 |
| 6,330,562 | B1 | 12/2001 | Boden et al. | 707/10 |
| 6,332,163 | B1 | 12/2001 | Bowman-Amauh | 709/231 |
| 6,339,832 | B1 | 1/2002 | Bowman-Amauh | 714/35 |
| 6,434,568 | B1 | 8/2002 | Bowman-Amauh | 707/103 R |
| 6,434,628 | B1 | 8/2002 | Bowman-Amauh | 714/48 |
| 6,438,594 | B1 | 8/2002 | Bowman-Amauh | 709/225 |
| 6,442,748 | B1 | 8/2002 | Bowman-Amauh | 717/108 |
| 6,466,964 | B1 | 10/2002 | Leung et al. | 709/202 |
| 6,477,580 | B1 | 11/2002 | Bowman-Amauh | 709/231 |
| 6,477,665 | B1 | 11/2002 | Bowman-Amauh | 714/39 |
| 6,480,485 | B1 | 11/2002 | Kari et al. | 370/352 |
| 6,490,451 | B1 | 12/2002 | Denman et al. | 455/436 |
| 6,493,547 | B1 | 12/2002 | Raith | 455/405 |
| 6,496,850 | B1 | 12/2002 | Bowman-Amauh | 709/203 |
| 6,502,213 | B1 | 12/2002 | Bowman-Amauh | 714/49 |
| 6,510,513 | B1 | 1/2003 | Danieli | 713/156 |
| 6,529,909 | B1 | 3/2003 | Bowman-Amauh | 707/10 |
| 6,529,948 | B1 | 3/2003 | Bowman-Amauh | 709/217 |
| 6,539,396 | B1 | 3/2003 | Bowman-Amauh | 707/103 R |
| 6,549,949 | B1 | 4/2003 | Bowman-Amauh | 709/236 |
| 6,550,057 | B1 | 4/2003 | Bowman-Amauh | 717/126 |
| 6,571,282 | B1 | 5/2003 | Bowman-Amauh | 709/219 |
| 6,578,068 | B1 | 6/2003 | Bowman-Amauh | 709/203 |
| 6,601,192 | B1 | 7/2003 | Bowman-Amauh | 714/38 |
| 6,601,234 | B1 | 7/2003 | Bowman-Amauh | 717/108 |
| 6,606,660 | B1 | 8/2003 | Bowman-Amauh | 709/227 |
| 6,611,821 | B2 | 8/2003 | Stahl et al. | 705/400 |
| 6,615,199 | B1 | 9/2003 | Bowman-Amauh | 706/50 |
| 6,615,253 | B1 | 9/2003 | Bowman-Amauh | 709/219 |
| 6,615,263 | B2 | 9/2003 | Dulai et al. | 709/225 |
| 6,621,820 | B1 | 9/2003 | Williams et al. | 370/395.31 |
| 6,636,242 | B2 | 10/2003 | Bowman-Amauh | 715/764 |
| 6,640,238 | B1 | 10/2003 | Bowman-Amauh | 709/201 |
| 6,640,244 | B1 | 10/2003 | Bowman-Amauh | 709/207 |
| 6,647,262 | B1 | 11/2003 | Demetrescu et al. | 455/436 |
| 6,665,537 | B1 | 12/2003 | Lioy | 455/435 |
| 6,665,718 | B1 | 12/2003 | Chuah et al. | 709/225 |
| 6,671,675 | B2 | 12/2003 | Iwamura | 705/30 |
| 6,684,243 | B1 | 1/2004 | Euget et al. | 709/222 |
| 6,684,256 | B1 | 1/2004 | Warrier et al. | 709/238 |
| 6,708,225 | B1 | 3/2004 | Cho et al. | 709/317 |
| 6,714,515 | B1 | 3/2004 | Marchand | 370/231 |
| 6,715,145 | B1 | 3/2004 | Bowman-Amauh | 718/101 |
| 6,728,266 | B1 | 4/2004 | Sabry et al. | 370/468 |
| 6,728,365 | B1 | 4/2004 | Li et al. | 379/329 |
| 6,728,884 | B1 | 4/2004 | Lim | 713/201 |
| 6,742,015 | B1 | 5/2004 | Bowman-Amauh | 718/101 |
| 6,742,036 | B1 | 5/2004 | Das et al. | 709/226 |
| 6,757,371 | B2 | 6/2004 | Kim et al. | 379/114.22 |
| 6,760,444 | B1 | 7/2004 | Leung | 380/270 |
| 6,768,726 | B2 | 7/2004 | Dorenbosch et al. | 370/331 |
| 6,769,000 | B1 | 7/2004 | Akhtar et al. | 707/103 R |
| 6,771,623 | B2 | 8/2004 | Ton | 370/331 |
| 6,785,256 | B1 | 8/2004 | O'Neill | 370/338 |
| 6,804,518 | B2 | 10/2004 | Core et al. | 455/436 |
| 6,826,173 | B1 | 11/2004 | Kung et al. | 370/352 |
| 6,829,709 | B1 | 12/2004 | Acharya et al. | 713/160 |
| 6,834,341 | B1 | 12/2004 | Bahl et al. | 713/156 |
| 6,839,338 | B1 | 1/2005 | Amara et al. | 370/328 |
| 6,842,906 | B1 | 1/2005 | Bowman-Amauh | 719/330 |
| 6,856,676 | B1 | 2/2005 | Pirot et al. | 379/201.01 |
| 6,889,321 | B1 | 5/2005 | Kung et al. | 713/153 |
| 6,907,501 | B2 | 6/2005 | Tariq et al. | 711/118 |
| 6,910,074 | B1 | 6/2005 | Amin et al. | 709/227 |
| 6,915,345 | B1 | 7/2005 | Tummala et al. | 709/225 |
| 6,917,605 | B2 | 7/2005 | Kakemizu et al. | 370/338 |
| 6,920,503 | B1 | 7/2005 | Nanji et al. | 709/230 |
| 6,922,404 | B1 | 7/2005 | Narayanan et al. | 370/338 |
| 6,925,160 | B1 | 8/2005 | Stevens et al. | 379/121.05 |
| 6,947,401 | B2 | 9/2005 | El-Malki et al. | 370/331 |
| 6,961,774 | B1 | 11/2005 | Shannon et al. | 709/227 |
| 6,967,941 | B2 | 11/2005 | Roy | 370/338 |
| 6,978,128 | B1 | 12/2005 | Raman et al. | 455/414 |
| 6,980,802 | B2 | 12/2005 | Jung | 455/436 |
| 6,980,962 | B1 | 12/2005 | Arganbright et al. | 705/26 |
| 6,981,047 | B2 | 12/2005 | Hanson et al. | 709/227 |
| 6,982,967 | B1 | 1/2006 | Leung | 370/328 |
| 6,990,337 | B2 | 1/2006 | O'Neill et al. | 455/422.1 |
| 6,993,333 | B2 | 1/2006 | Laroia et al. | 455/436 |
| 7,003,294 | B2 * | 2/2006 | Singhai et al. | 455/435.1 |
| 7,020,697 | B1 | 3/2006 | Goodman et al. | 709/223 |
| 7,024,687 | B2 | 4/2006 | Chaudhuri et al. | 726/3 |
| 7,028,311 | B2 | 4/2006 | Roach et al. | 719/328 |
| 7,039,027 | B2 | 5/2006 | Bridgelall | 370/329 |
| 7,054,268 | B1 | 5/2006 | Paranteinen et al. | 370/231 |
| 7,079,499 | B1 | 7/2006 | Akhtar et al. | 370/310 |
| 7,082,301 | B2 | 7/2006 | Jagadeesan et al. | 455/436 |
| 7,103,359 | B1 | 9/2006 | Heinonen et al. | 455/436 |
| 7,127,234 | B2 | 10/2006 | Ishii | 455/411 |
| 7,130,286 | B2 | 10/2006 | Koodli et al. | 370/331 |
| 7,133,386 | B2 | 11/2006 | Holur et al. | 370/331 |
| 7,151,758 | B2 | 12/2006 | Kumaki et al. | 370/331 |
| 7,151,772 | B1 | 12/2006 | Kalmanek et al. | 370/390 |
| 7,154,868 | B1 | 12/2006 | Sharma et al. | 370/331 |
| 7,161,914 | B2 | 1/2007 | Shoaib et al. | 370/331 |
| 7,171,555 | B1 | 1/2007 | Salowey et al. | 713/156 |
| 7,184,418 | B1 | 2/2007 | Baba et al. | 370/331 |
| 7,187,931 | B2 | 3/2007 | Trossen | 455/440 |
| 7,190,793 | B2 | 3/2007 | Hsu | 380/270 |
| 7,197,763 | B2 | 3/2007 | Hsu | 726/4 |
| 7,212,821 | B2 | 5/2007 | Laroia et al. | 455/437 |
| 7,230,951 | B2 * | 6/2007 | Mizell et al. | 370/401 |
| 7,233,583 | B2 | 6/2007 | Asthana et al. | 370/332 |
| 7,251,733 | B2 | 7/2007 | Haverinen et al. | 713/182 |
| 7,263,371 | B2 | 8/2007 | Das et al. | 455/456.1 |
| 7,269,727 | B1 | 9/2007 | Mukherjee et al. | 713/160 |
| 7,272,122 | B2 | 9/2007 | Trossen et al. | 370/331 |
| 7,272,123 | B2 | 9/2007 | Wall | 370/331 |
| 7,275,156 | B2 | 9/2007 | Balfanz et al. | 713/168 |
| 7,389,106 | B2 | 6/2008 | Dawson et al. | 455/406 |
| 2001/0023428 | A1 | 9/2001 | Miyazaki et al. | 709/201 |
| 2002/0021681 | A1 | 2/2002 | Madour | 370/331 |
| 2002/0023174 | A1 * | 2/2002 | Garrett et al. | 709/245 |
| 2002/0036982 | A1 | 3/2002 | Chen | 370/230 |
| 2002/0059114 | A1 | 5/2002 | Cockrill et al. | 705/27 |
| 2002/0091802 | A1 | 7/2002 | Paul et al. | 709/220 |
| 2002/0138601 | A1 | 9/2002 | Piponius et al. | 709/223 |
| 2002/0151312 | A1 | 10/2002 | Bos et al. | 455/452 |
| 2003/0021252 | A1 | 1/2003 | Harper et al. | 370/338 |
| 2003/0039237 | A1 | 2/2003 | Forslow | 370/352 |
| 2003/0154400 | A1 | 8/2003 | Pirttimaa et al. | 713/201 |
| 2003/0174688 | A1 | 9/2003 | Ahmed et al. | 370/349 |
| 2003/0187817 | A1 | 10/2003 | Agrawal et al. | 707/1 |
| 2003/0217165 | A1 | 11/2003 | Buch et al. | 709/229 |
| 2004/0034695 | A1 | 2/2004 | Touch et al. | |
| 2004/0114553 | A1 | 6/2004 | Jiang et al. | 370/328 |
| 2004/0162876 | A1 | 8/2004 | Kohavi | 709/203 |
| 2004/0162892 | A1 | 8/2004 | Hsu | 709/221 |
| 2004/0196821 | A1 | 10/2004 | Haddad et al. | 370/349 |
| 2004/0210524 | A1 | 10/2004 | Benenati et al. | 705/40 |
| 2004/0259562 | A1 | 12/2004 | Madour | 455/452.2 |
| 2005/0002407 | A1 | 1/2005 | Shaheen et al. | 370/401 |
| 2005/0025132 | A1 | 2/2005 | Harper et al. | 370/352 |
| 2005/0102421 | A1 * | 5/2005 | Horvath et al. | 709/238 |
| 2005/0130659 | A1 | 6/2005 | Grech et al. | 455/436 |
| 2005/0149651 | A1 | 7/2005 | Doak et al. | 710/52 |
| 2005/0176428 | A1 | 8/2005 | Gabor et al. | 455/435.1 |
| 2005/0188093 | A1 * | 8/2005 | Haddad | 709/228 |
| 2005/0195766 | A1 | 9/2005 | Nasieiski et al. | 370/331 |
| 2005/0201324 | A1 | 9/2005 | Zheng | 370/328 |
| 2005/0213606 | A1 | 9/2005 | Huang et al. | 370/467 |
| 2005/0220039 | A1 | 10/2005 | Hoshino et al. | 370/261 |
| 2005/0259631 | A1 * | 11/2005 | Rajahalme | 370/351 |
| 2005/0265278 | A1 * | 12/2005 | Hsu et al. | 370/328 |
| 2005/0278420 | A1 | 12/2005 | Hartikainen et al. | 709/203 |
| 2005/0286709 | A1 | 12/2005 | Horton et al. | 379/265.09 |
| 2006/0014547 | A1 | 1/2006 | Walter | 455/456.1 |
| 2006/0018272 | A1 | 1/2006 | Mutikainen et al. | 370/328 |

| | | | |
|---|---|---|---|
| 2006/0077924 A1 | 4/2006 | Rune | 370/328 |
| 2006/0116113 A1 | 6/2006 | Gass | 455/414.4 |
| 2006/0126630 A1 | 6/2006 | Shirazipour et al. | 370/392 |
| 2006/0140177 A1* | 6/2006 | Karhu | 370/356 |
| 2006/0141995 A1* | 6/2006 | Purnadi et al. | 455/414.1 |
| 2006/0171310 A1 | 8/2006 | Ahluwalia et al. | 370/229 |
| 2006/0251038 A1 | 11/2006 | Tamura et al. | 370/342 |
| 2006/0264207 A1 | 11/2006 | Tamura et al. | 455/415 |
| 2006/0268819 A1* | 11/2006 | Chen et al. | 370/349 |
| 2007/0008882 A1 | 1/2007 | Oran | 370/229 |
| 2007/0036312 A1 | 2/2007 | Cai et al. | 379/126 |
| 2007/0086582 A1 | 4/2007 | Tai et al. | 379/114.01 |
| 2007/0094712 A1 | 4/2007 | Gibbs et al. | 726/3 |
| 2007/0121615 A1 | 5/2007 | Weill et al. | 370/389 |
| 2007/0121642 A1 | 5/2007 | Battin et al. | 370/395.2 |
| 2007/0153720 A1 | 7/2007 | Baglin et al. | 370/328 |
| 2007/0254661 A1 | 11/2007 | Chowdhury | 455/436 |

FOREIGN PATENT DOCUMENTS

| | | |
|---|---|---|
| WO | WO 99/31610 | 6/1999 |
| WO | WO 2005/107297 | 11/2005 |

OTHER PUBLICATIONS

Centaur Communications, "Secret Bear platform allows paid-for SMS Annotated Title—Secret Bear introduced cross-network reverse billing platform allowing content providers to charge for SMS content," New Media Age, NDN 173-0354-6130-3, 1 pg, Jun. 28, 2001.

Karsten Lüttge, "E-Charging API: Outsource Charging to a Payment Service Provider," NDN 174-0708-0924-8, pp. 216-227, 2001.

A. Herzberg, "Safeguarding Digital Library Contents: Charging for Online Content," D-Lib Magazine, NDN 174-0590-9051-8, 16 pgs, Jan. 1998.

Business Wire, "Apogee Networks Introduces Industry's First Content Usage-Based Billing Solution for Web Hosters," NDN 219-0281-6988-1, 2 pgs, May 8, 2001.

Business Wire, "Apogee Networks Announces Investment by Cisco Systems; Combined Efforts Enhance Billing Capabilities for Content Delivery Network Providers," NDN 219-0220-9035-0, 2 pgs, Jan. 23, 2001.

Business Wire, "Key Analysts Predict Content Billing is the Internet's New Frontier; Content is the Asset of the Industry; Apogee Networks Seen as the Leader in New Internet Industry Space," NDN 219-0162-6934-6, 3 pgs, Oct. 10, 2000.

Business Wire, "Apogee Networks Unveils NetCountant Wireless Billing At SUPERCOMM; Company Demonstrates Industry First Wireless Content Usage Based Billing Solution," NDN 218-0324-8075-6, 2 pgs, Jun. 5, 2001.

Business Wire, "Apogee Networks Wins 2000 Communications ASP Product of the Year Award; Apogee Networks' NetCountant Billing Takes Top Honors for Innovative Content Usage Based Billing Solutions," NDN 218-0282-3757-7, 2 pgs, Mar. 21, 2001.

Business Wire, "Wireless Internet Content Billing and Settlement Capability Announced; Companies Announce Interoperability Between WAP Gateway and Content Billing System," NDN 218-0220-0997-2, 2 pgs, Dec. 6, 2000.

Business Wire, "Apogee Networks Joins Content Alliance; Billing Expert to Join Industry Group Aimed At Advancing Content Networking," NDN 218-0181-2716-7, 3 pgs, Oct. 11, 2000.

Business Wire, "Apogee Networks, Inc. and Paysys International, Inc. to Integrate Technologies to Create Advanced IP Content Billing Solutions," NDN 218-0098-0623-9, 3 pgs, Jun. 19, 2000.

Ylitalo, et al., *Re-thinking Security in IP based Micro-Mobility*, downloaded from www.tcs.hut.fi/Studies/T-79.5401/2005AUT/ISCO4-Vlitalo-e-al.pdf (12 pages).

PCT Notification of Transmittal of the International Search Report and the Written Opinion of the International Searching Authority, or the Declaration with attached PCT International Search Report and Written Opinion of the International Searching Authority in International Application No. PCT/US 07/05937, dated Oct. 25, 2007, 6 pages, Oct. 25, 2007.

Draft—TR45—PN-3-4732-RV4 (to be published as TIA-835.1-D), 32 pages.

Draft—TR45—PN-3-4732-RV4 (to be published as TIA-835.2-D), 93 pages.

Draft—TR45—PN-3-4732-RV4 (to be published as TIA-835.3-D), 36 pages.

Draft—TR45—PN-3-4732-RV4 (to be published as TIA-835.4-D), 70 pages.

Draft—TR45—PN-3-4732-RV4 (to be published as TIA-835.5-D), 72 pages.

Draft—TR45—PN-3-4732-RV4 (to be published as TIA-835.6-D), 36 pages.

3GPP2 C.S0067, 3rd Generation Partnership Project 2 '3GPP2', "Generic Key Exchange Protocol for cdma2000 High Rate Packet Data Air Interface," Version 1.0, 24 pages, Nov. 2005.

3GPP2 X.S0011-001-D, 3rd Generation Partnership Project 2 '3GPP2', "cdma2000 Wireless IP Network Standard: Introduction," Version 1.0, 33 pages, Feb. 2006.

3GPP2 C.S0063-0, 3rd Generation Partnership Project 2 '3GPP2', "cdma2000 High Rate Packet Data Supplemental," Version 1.0, 127 pages, Mar. 2006.

3GPP2 A.S0008-A v.1.0, 3rd Generation Partnership Project 2 '3GPP2,' Interoperability Specification (IOS) for High Rate Packet Data (HRPD) Radio Access Network Interfaces with Session Control in the Access Network, 257 pages, Mar. 2006.

3GPP2 C.S0024-A, 3rd Generation Partnership Project 2 '3GPP2', "cdma2000 High Rate Packet Data Air Interface Specification," Version 2.0, 1,223 pages, Jul. 2005.

B. Aboba, et al., "Extensible Authentication Protocol (EAP)," Network Working Group, RFC 3748, http://www.ietf.org/rfc/rfc3748.txt, 59 pages, Jun. 2004.

B. Aboba, D. Simon, "PPP EAP TLS Authentication Protocol," Network Working Group, RFC 2716, http://www.ietf.org/rfc/rfc2716.txt, 22 pages, Oct. 1999.

W. Simpson, "PPP Challenge Handshake Authentication Protocol (CHAP)," Network Working Group, RFC 1994, http://www.ietf.org/rfc/rfc1994.txt, 12 pages, Aug. 1996.

W. Simpson, "The Point-to-Point (PPP)," Network Working Group, RFC 1661, http://www.ietf.org/rfc/rfc1661.txt, 47 pages, Jul. 1994.

P. Eronen, et al., "Diameter Extensible Authentication Protocol (EAP) Application," Network Working Group, RFC 4072, http://www.ietf.org/rfc/rfc4072.txt, 29 pages, Aug. 2005.

P. Calhoun, et al., "Diameter Base Protocol," Network Working Group, RFC 3588, http://www.ietf.org/rfc/rfc3588.txt, 129 pages, Sep. 2003.

3rd Generation Partnership Project 2 "3GPP2"; "All-IP Core Network Multimedia Domain: Service Based Bearer Control- Stage 2;www.3gpp2.org-"; Version 1.0. Draft Version 0.21.0, 49 pages.

PCT Notification of Transmittal of the International Search Report and the Written Opinion of the International Searching Authority, or the Declaration, International Application No. PCT/US07/05847, 9 pages, Oct. 26, 2007.

PCT Notification of Transmittal of the International Search Report and the Written Opinion of the International Searching Authority, or the Declaration, International Application No. PCT/US07/05849, 9 pages, Nov. 14, 2007.

Yegani et al., "System and Method for Access Authentication in a Mobile Wireless Network," U.S. Appl. No. 11/419,382, 20 pps, 3 pps drawings, filed May 19, 2006.

Yegani et al., "System and Method for Handover of an Access Terminal in a Communication Network," U.S. Appl. No. 11/682,735, 24 pps, 3 pps drawings, filed Mar. 6, 2007.

Yegani et al., "Enforcement of User Level Policies from Visited Networks in a Mobile IP Environment," U.S. Appl. No. 11/682,817, 22 pps, 2 pps drawings, filed Mar. 6, 2007.

Yegani et al, Authentication of Access Terminals in a Cellular Communication Network,: U.S. Appl. No. 11/682,857, 28 pps, 5 pps drawings, filed Mar. 6, 2007.

Andreasen et al., "System and Method of Consolidating Accounting Data for a Communication Session," U.S. Appl. No. 11/714,974, 40 pps, 3 pps drawings, filed Mar. 6, 2007.

Panda et al., "System and Method for Capturing Accounting Data for a Communication Session," U.S. Appl. No. 11/715,018, filed Mar. 6, 2007.

Rosenberg et al., "System and Method for Determining a Network for Processing Applications for a Communication Session," U.S. Appl. No. 11/715,019, 40 pps, 3 pps drawings, filed Mar. 6, 2007.

Rosenberg et al., "Determining a Policy Output for a Communication Session," U.S. Appl. No. 11/715,032, 31 pps, 4 pps drawings, filed Mar. 6, 2007.

Andreasen et al., "Posture-Based Network Authentication," U.S. Appl. No. 11/715,040, 23 pages, 2 pps drawings, filed Mar. 6, 2007.

Iyer et al., "Access Terminal for Communicating Packets Using a Home Anchored Bearer Path," U.S. Appl. No. 11/715,041, 33 pps, 4 pps drawings, filed Mar. 6, 2007.

Rosenberg et al., "System and Method for Exchanging Policy Information in a Roaming Communications Environment," U.S. Appl. No. 11/715,056, 42 pps, 3 pps drawings, filed Mar. 6, 2007.

Rosenberg et al., "Establishing Facets of a Policy for a Communication Session," U.S. Appl. No. 11/715,065, 32 pps, 4 pps drawings, filed Mar. 6, 2007.

Rosenberg et al., "Performing Deep Packet Inspection for a Communication Session," U.S. Appl. No. 11/715,073, 31 pps, 4 pps drawings, filed Mar. 6, 2007.

Rosenberg et al., "Assigning a Serving- CSCF During Access Authentication," U.S. Appl. No. 11/715,074, 22 pps, 2 pps drawings, filed Mar. 6, 2007.

Rosenberg et al., "System and Method for Providing Emergency Services in a Visited Communications Environment," U.S. Appl. No. 11/715,111, 39 pps, 2 pps drawings, filed Mar. 6, 2007.

Panda et al., "Application-Aware Policy Enforcement," U.S. Appl. No. 11/715,187, 28 pps, 2 pps drawings, filed Mar. 6, 2007.

Andreasen et al., "System and Method for Generating a Unified Accounting Record for a Communication Session," U.S. Appl. No. 11/715,210, 46 pps, 3 pps drawings, filed Mar. 6, 2007.

Andreasen et al., "Network-triggered quality of service (QoS) Reservation," U.S. Appl. No. 11/715,250, 21 pps, 2 pps drawings, filed Mar. 6, 2007.

Andreasen et al.,; "Policy-Based Control of Content Intercept", U.S. Appl. No. 11/715,251, 23 pps, 2 pps drawings, filed Mar. 6, 2007.

Rosenberg et al., "System and Method for Network Charging Using Policy Peering," U.S. Appl. No. 11/715,256, 43 pps, 3 pps drawings, filed Mar. 6, 2007.

PCT Notification of Transmittal of the International Search Report and the Written Opinion of the International Searching Authority, or the Declaration with attached PCT International Search Report and Written Opinion of the International Searching Authority in International Application No. PCT/US2006/046800, dated Nov. 10, 2008, 10 pages.

*USPTO*, Office Action dated Nov. 28, 2008 for U.S. Appl. No. 11/715,041 in the name of Jayaraman R. Iyer, 34 pages.

*USPTO*, Office Action dated Dec. 2, 2009 for U.S. Appl. No. 11/715,041 in the name of Jayaraman R. Iyer, 21 pages.

*USPTO*, Final Office Action dated Jun. 22, 2009 for U.S. Appl. No. 11/715,041 in the name of Jayaraman R. Iyer, 28 pages.

*USPTO*, Final Office Action dated Jun. 22, 2009 for U.S. Appl. No. 11/715,041 in the name of Jayaraman R. Iyer, 20 pages.

\* cited by examiner

COMMUNICATING PACKETS USING A HOME ANCHORED BEARER PATH OR A VISITED ANCHORED BEARER PATH

RELATED APPLICATION

This application claims priority under 35 U.S.C. 119(e) of U.S. Provisional Application Ser. No. 60/780,176, entitled "VERIZON WIRELESS MULTI-MEDIA PLUS (MMD+) PROGRAM SYSTEM ARCHITECTURE DOCUMENT," filed Mar. 6, 2006, by Flemming Andreasen et al., which is incorporated herein by reference.

TECHNICAL FIELD

This invention relates generally to the field of telecommunications and more specifically to communicating packets using a home anchored bearer path or a visited anchored bearer path.

BACKGROUND

An endpoint, such as an access terminal, may use a system of communication networks to communicate packets with other endpoints. For example, an access terminal may subscribe to a home network that maintains subscription information for the access terminal. If the access terminal is outside of the serving area of the home network, the access terminal may use a visited network to communicate packets.

Certain known techniques may be used to route packets between endpoints and through networks. These known techniques, however, are not efficient in certain situations. In certain situations, it is generally desirable to be efficient.

SUMMARY OF THE DISCLOSURE

In accordance with the present invention, disadvantages and problems associated with previous techniques for communicating packets may be reduced or eliminated.

According to one embodiment of the present invention, communicating packets along a bearer path includes providing a home network address and a visited network address to an access terminal. The home network address corresponds to a home anchored bearer path anchored at a home network of the access terminal, and the visited network address corresponds to a visited anchored bearer path anchored at a visited network. Packets are received from the access terminal. The packets are communicated along the home anchored bearer path if the packets use the home network address. The packets are communicated along the visited anchored bearer path if packets use the visited network address. The home anchored bearer path may use the visited anchored bearer path to forward packets to and from the home network address.

Certain embodiments of the invention may provide one or more technical advantages. A technical advantage of one embodiment may be that packets from an access terminal can be communicated along a home anchored path or a visited anchored path. The home anchored path includes a home bearer manager of a home network and may include a visited bearer manager of a visited network. The visited anchored path includes the visited bearer manager, but not the home bearer manager.

Another technical advantage of one embodiment may be that the access terminal can be provided with a home network address and a visited network address. The home network address may be used to communicate packets along the home anchored path, and the visited network address may be used to communicate packets along the visited anchored path.

Another technical advantage of one embodiment may be that a home policy server of the home network may provide policy rules to a visited policy server of the visited network. The policy rules may be used to enforce policies for packets sent along the visited anchored path.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION OF THE DRAWINGS

Embodiments of the present invention and its advantages are best understood by referring to FIGS. 1 through 5 of the drawings, like numerals being used for like and corresponding parts of the various drawings.

Figure 1:
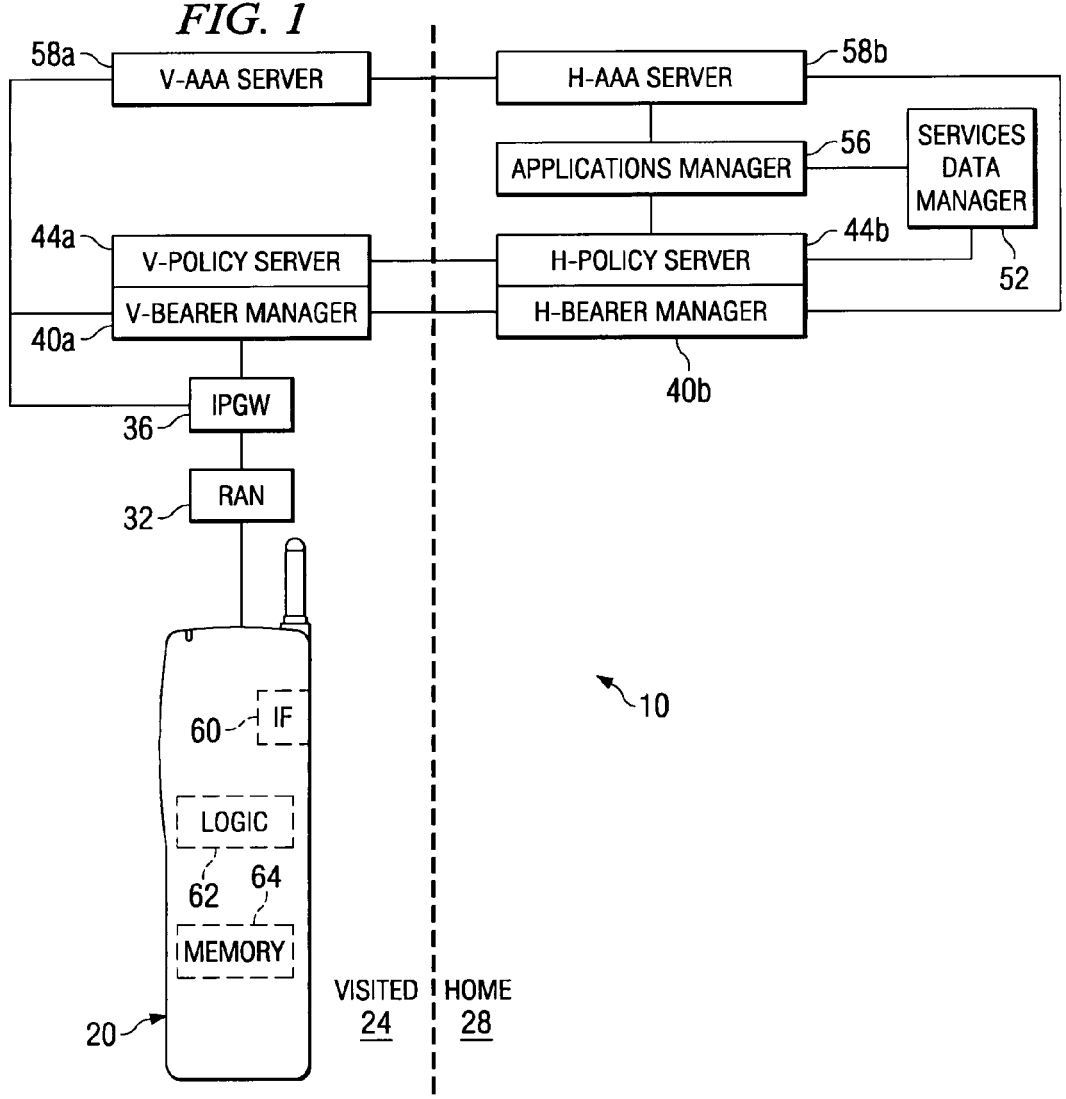
FIG. 1 illustrates one embodiment of a system that communicates packets for an access terminal.

FIG. 1 illustrates one embodiment of a system 10 that communicates packets for an access terminal 20. According to the embodiment, packets from access terminal 20 can be communicated along a home anchored path or a visited anchored path. The home anchored path includes a home bearer manager 40*b* of a home network 28 of access terminal 20 and a visited bearer manager 40*a* of a visited network 24. The visited anchored path includes visited bearer manager 40*a*, but not home bearer manager 40*b*. In the embodiment, access terminal 20 can be provided with a home network address (H-NA) and a visited network address (V-NA). The home network address may be used to communicate packets along the home anchored path, and the visited network address may be used to communicate packets along the visited anchored path.

According to the illustrated embodiment, system 10 provides services such as communication sessions to endpoints such as access terminal 20. A communication session refers to an active communication between endpoints. Information may be communicated during a communication session. Information may refer to voice, data, text, audio, video, multimedia, control, signaling, other information, or any combination of any of the preceding. Information may be communicated in packets. A packet may comprise a bundle of data organized in a specific way for transmission.

System 10 may utilize communication protocols and technologies to provide the communication sessions. Examples of communication protocols and technologies include those set by the Institute of Electrical and Electronics Engineers, Inc. (IEEE) 822.xx standards, the International Telecommunications Union (ITU-T) standards, the European Telecommunications Standards Institute (ETSI) standards (for example, General Packet Radio Services (GPRS)), the Internet Engineering Task Force (IETF) standards (for example, IP such as mobile IP), or other standards.

According to the illustrated embodiment, system 10 includes access terminals 20. Access terminal 20 represents any suitable device operable to communicate with a communication network. Access terminal 20 may comprise, for example, a personal digital assistant, a computer such as a laptop, a cellular telephone, a mobile handset, or any other device operable to communicate with system 10. Access terminal 20 may support any suitable protocol, for example, simple IP and/or mobile IP.

System 10 also includes communication networks such as a visited network 24 and a home network 28. In general, a communication network may comprise at least a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, other suitable communication link, or any combination of the preceding.

In the illustrated embodiment, visited network 24 represents a communication network that facilitates a communication session for access terminal 20 within the serving area of visited network 24. Home network 28 represents a communication network that maintains a subscription for access terminal 20. The subscription may include an account that is charged based upon usage by access terminal 20. Visited network 24 and home network 28 may be part of the same or different communication networks.

Visited network 24 and home network 28 may include any suitable components for facilitating a communication session for access terminal 20. According to the illustrated embodiment, visited network 24 includes a radio access network (RAN) 32, an IP gateway 36, a visited bearer manager (V-BM) 40a, a visited policy server (V-PS) 44a, a visited authentication, authorization, and accounting (AAA) server (V-AAA) 58a. Home network 28 includes a home bearer manager (H-BM) 40b, a home policy server (H-PS) 44b, a services data manager (SDM) 52, an applications manager (AM) 56, and a home AAA server (H-AAA) 58b coupled as shown.

Radio access network 32 provides access services to access terminal 20. For example, radio access network 32 may provide layer 2 mobile access, mobility, and/or handoff services within its area of coverage.

IP gateway 36 operates as a gateway between radio access network 32 and an IP network. IP gateway 36 may perform operations such as authenticating access terminal 20, assigning a bearer manager 40 to access terminal 20, performing handoff functions between two IP gateways 36 or IP gateway 36 and radio access network 32, and/or facilitating registration of access terminal 20 to the IP network. In one embodiment, IP gateway 36 may comprise a packet data serving node (PDSN).

Bearer managers 40 allocate resources and provide bearer paths that communicate packets to and/or from access terminal 20. According to one embodiment, a bearer manager 40 operates as an anchor for a bearer path. Bearer manager 40 may also operate as a home or foreign agent that authorizes use of a network address that allows access terminal 20 to use the bearer path anchored by bearer manager 40.

In the illustrated embodiment, visited bearer manager 40a of visited network 24 provides services to access terminal 20 in visited network 24. According to one embodiment, a visited bearer manager 40a operates as an anchor for a visited anchored path. In the embodiment, visited bearer manager 40a provides a visited network address that allows access terminal 20 to use the visited anchored path. An example of a visited network address includes a visited IP (V-IP) address.

In the illustrated embodiment, home bearer manager 40b of home network 28 provides services to access terminal 20. According to one embodiment, home bearer manager 40b operates as an anchor for a home anchored path. In the embodiment, home bearer manager 40b provides a home network address that allows access terminal 20 to use the home anchored path. An example of a home network address includes a home IP (H-IP) address. The visited home anchored paths are described in more detail with reference to FIG. 2.

Figure 2:
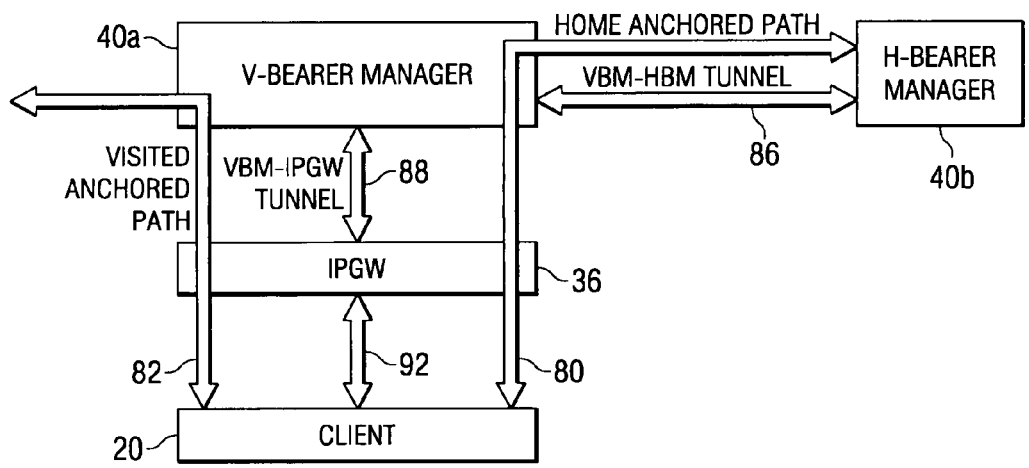
FIG. 2 illustrates examples of bearer paths of the system of FIG. 1.

FIG. 2 illustrates examples of bearer paths of system 10 of FIG. 1. The bearer paths include a home anchored path 80 and a visited anchored path 82. Home anchored path 80 is anchored at home bearer manager 40b and passes through visited bearer manager 40a. Home anchored path 80 may allow visited bearer manager 40a to perform operations for packets on path 80, for example, enforce packet policies, account for the packets, and/or perform other operations. The home network address allows access terminal 20 to use home anchored path 80. Packets that have the visited network address as a care-of address for the home network address may be routed along path 80.

Visited anchored path 82 is anchored at visited bearer manager 40a, and does not pass through home bearer manager 40b. Accordingly, visited anchored path 82 may have a latency that is lower than home anchored path 80. The visited network address allows access terminal 20 to use visited anchored path 82.

Paths 82 and 80 may be utilized in any suitable manner. For example, visited anchored path 82 may be used for situations with stricter latency requirements, but home anchored path 80 may be used for situations that require a more stable path. Home anchored path 80 also enables home network 28 to provide home network specific functions and services that are not supported by visited network 24. In certain cases, both paths 82 and 80 may be used. For example, home anchored path 80 may be used for signaling, and visited anchored path 82 may be used for media. In one embodiment, home anchored path 80 may be the default path.

HBM-VBM tunnel 86 represents a bi-directional tunnel between home bearer manager 40b and visited bearer manager 40a. VBM-IPGW tunnel 88 represents a bi-directional tunnel between visited bearer manager 40a and IP gateway 36. VBM-IPGW tunnel 88 may allow visited bearer manager 40a to forward traffic to access terminal 20 via IP gateway 36, and may comprise, for example, a proxy mobile IP (PMIP) tunnel. Link 92 represents a communication link between IP gateway 36 and access terminal 20. Link 92 may comprise, for example, a point-to-point (PPP), A.10, or A.11 link.

Referring back to FIG. 1, network addresses may be communicated to access terminal 20 in any suitable manner. As an example, a network address may be communicated using the Dynamic Host Configuration Protocol (DHCP). As another example, network address may be communicated using the Point-to-Point Protocol (PPP).

Bearer managers 40 may perform other suitable operations to provide services to access terminal 20. Examples of other suitable operations include processing signaling, committing resources, and maintaining gateways for access terminal 20.

Other examples include enforcing network policies (such as mobility policies), providing security, detecting application layer traffic, recording network presence, and/or performing other suitable operation.

A bearer manager 40 may comprise any suitable device, for example, a Serving General Packet Radio Services (GPRS) Support Node (SGSN), a GPRS Gateway Support Node (GGSN), a home/foreign agent, a mobile gateway, a mobile IPv6 node, or a Packet Data Serving Node (PDSN). A bearer manager 40 may use any suitable protocol, for example, an IP Multimedia Subsystem (IMS) protocol.

Policy servers 44 manage policy rules and provide the policy rules to bearer managers 40. In the illustrated embodiment, policy server 44a provides policy rules to bearer manager 40a. Policy server 44b provides policy rules to bearer manager 40b, and may also provide policy rules to policy server 44a.

In one embodiment, a policy may include rules that specify an action to be taken in particular situations. Policies may include routing rules and other suitable rules such as charging, quality of service, usage tracking, and/or other rules. A routing rule may specify how to route a packet. For example, a routing rule may specify situations in which visited anchored path 82 or home anchored path 80 is to be used. For example, a rule may specify that if packet has a particular source and/or destination, then the packet to be routed along visited anchored path 82. Otherwise, the packet is to be routed along home anchored path 80. In one embodiment, a routing rule that allows the visited network address may be installed for a specific duration, and then revoked.

According to one embodiment, a routing rule may specify that home anchored path 80 is used for certain applications and visited anchored path 82 is used for other applications. For example, home anchored path 80 is used for signaling (such as session initiation protocol (SIP) signaling) and visited anchored path 82 is used for media (such as voice over IP (VoIP)).

Any suitable routing rule may be used. As an example, a routing rule may specify that if access terminals 20 engaged in a real-time communication session are being serviced by the same visited network 24, then use visited anchored path 82. As another example, a routing rule may specify that if there is not an appropriate relationship between visited network 24 and home network 28, then use home anchored path 80. As another example, a routing rule may specify that if high security that can only be provided by home network 28 is required, then use home anchored path 80.

In one embodiment, routing rules may used to provide instructions to access terminal 20 on when to use home anchored path 80 or visited anchored path 82. The instructions may be provided in any suitable manner. For example, the routing rule may be forwarded to access terminal 20. In the example, access terminal 20 may receive a URL to download the routing rules. As another example, access terminal 20 may be configured with the routing rule. As another example, visited bearer manager 40a may obtain the routing rule and may instruct access terminal 20 in accordance with the routing rule.

Services data manager (SDM) 52 stores subscriber data for access terminals 20. According to one embodiment, services data manager 52 may store policy documents that define policies. One or more subscribers may be associated with a particular policy document that defines the policies for those subscribers.

Application manager 56 manages applications, such as SIP applications and/or other suitable applications. The applications may be used to perform SIP operations (such as SIP registration, authorization, and routing), voice features (such as call routing and call forwarding), services (such as push-to-talk (PTT) and IP Centrex), Service Capabilities Interaction Management (SCIM), user presence services, and/or other operations. A non-SIP application manager may be used to perform non-SIP operations, such as real-time streaming media using Real Time Streaming Protocol (RTSP), gaming applications using proprietary protocols, and/or other operations. Application manager 56 may communicate with policy server 44 to request a policy to be implemented on its behalf for a particular access terminal 20.

AAA servers 58 perform authentication, authorization, and/or accounting operations. Home AAA server 58b performs these operations for access terminal 20. Visited AAA server 58a requests that home AAA server 58b performs these operations for access terminal 20 served by visited network 24.

A component of system 10 may include any suitable arrangement of elements, for example, an interface, logic, memory, other suitable element, or combination of any of the preceding. For example, access terminal 20 includes an interface 60, logic 62, and a memory 64. An interface receives input, sends output, processes the input and/or output, performs other suitable operation, or performs a combination of any of the preceding. An interface may comprise hardware and/or software.

Logic performs the operations of the component, for example, executes instructions to generate output from input. Logic may include hardware, software, other logic, or combination of any of the preceding. Certain logic, such as a processor, may manage the operation of a component. Examples of a processor include one or more computers, one or more microprocessors, one or more applications, other logic, or a combination of any of the preceding.

A memory stores information. A memory may comprise computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), other computer-readable medium, or a combination of any of the preceding.

Modifications, additions, or omissions may be made to system 10 without departing from the scope of the invention. The components of system 10 may be integrated or separated according to particular needs. Moreover, the operations of system 10 may be performed by more, fewer, or other modules. Additionally, operations of system 10 may be performed using any suitable logic. As used in this document, "each" refers to each member of a set or each member of a subset of a set.

Figure 3:
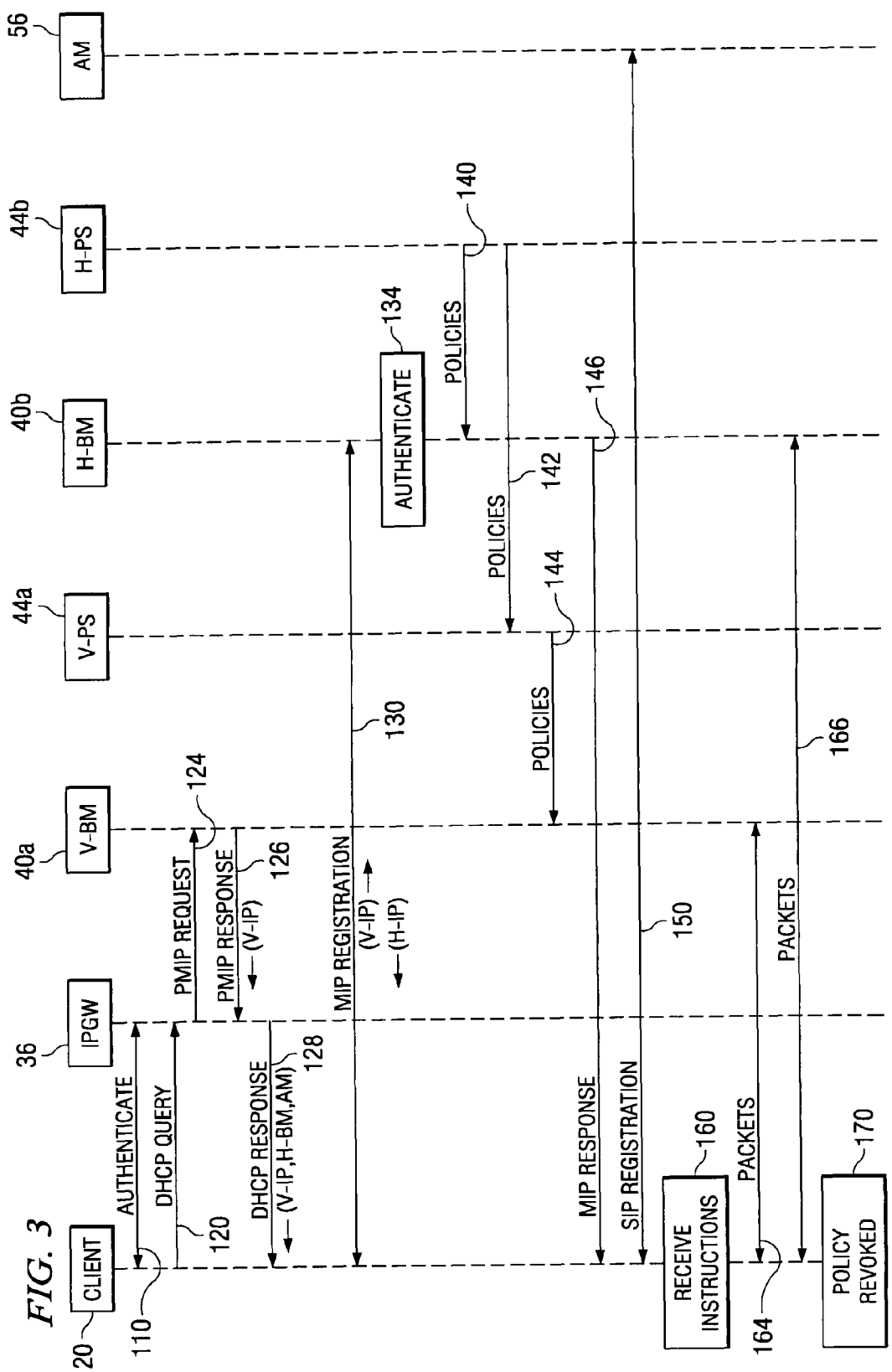
FIG. 3 illustrates one embodiment of a method for sending packets using either a home network address or a visited network address.

FIG. 3 illustrates one embodiment of a method for sending packets using either a home network address or a visited network address. The method may be used by system 10 of FIG. 1.

IP gateway 36 authenticates access terminal 20 at step 110. Access terminal 20 may be authenticated using any suitable protocol, for example, extensible authentication protocol (EAP). Authentication may provide gateway 36 with addresses of home bearer manager 40b and applications manager 56 of access terminal 20.

Access terminal 20 obtains a visited network address at steps 120 through 128. The visited network address may be obtained using any suitable protocol, for example, DHCP and a proxy mobile IP (PMIP). Access terminal 20 sends a DHCP query to IP gateway 36 at step 120. IP gateway 36 obtains the visited network address from visited bearer manager 40a at steps 124 through 126. Gateway 36 sends a proxy mobile IP request to visited bearer manager 40a at step 124. Visited bearer manager 40a sends a visited network address to IP gateway 36 in a proxy mobile IP response at step 126. IP gateway 36 sends the visited network address to access terminal 20 in a DHCP response at step 128. The DHCP response may also include addresses for home bearer manager 40b and applications manager (AM) 56.

Access terminal 20 obtains a home network address at steps 130 through 150. Access terminal 20 registers with home bearer manager 40b at step 130 according to mobile IP registration. During registration, home bearer manager 40b provides access terminal 20 with a home network address. Also, access terminal 20 notifies home bearer manager 40b of the visited network address as a point-of-attachment in order to include visited bearer manager 40a in home anchored path 80. Home bearer manager 40b authenticates the mobile IP registration at step 134. The authentication may be based on keys derived from the EAP authentication or from shared secret information provisioned for mobile IP authentication.

Home bearer manager 40b obtains policies from home policy server 44b at step 140. Home policy server 44b sends policies to visited policy server 44a at step 142. Visited bearer manager 40a obtains policies from visited policy server 44b at step 144. Home bearer manager 40b sends an mobile IP response to access terminal 20 at step 146. Access terminal 20 performs SIP registration with applications manager 56 at step 150.

Access terminal 20 receives instructions regarding the use of the visited and/or home network addresses at step 160. Access terminal 20 communicates packets using bearer paths 82 and/or 80 according to the policy at steps 164 and 166. Packets may be communicated along bearer path 182 at step 164 using visited network address, and/or packets may be communicated along bearer path 180 using home network address at step 166. Access terminal 20 communicates the packets according to the policy until the policy is revoked at step 170. After the policy is revoked, the method terminates.

Modifications, additions, or omissions may be made to the method without departing from the scope of the invention. The method may include more, fewer, or other steps. Additionally, steps may be performed in any suitable order.

Figure 4:
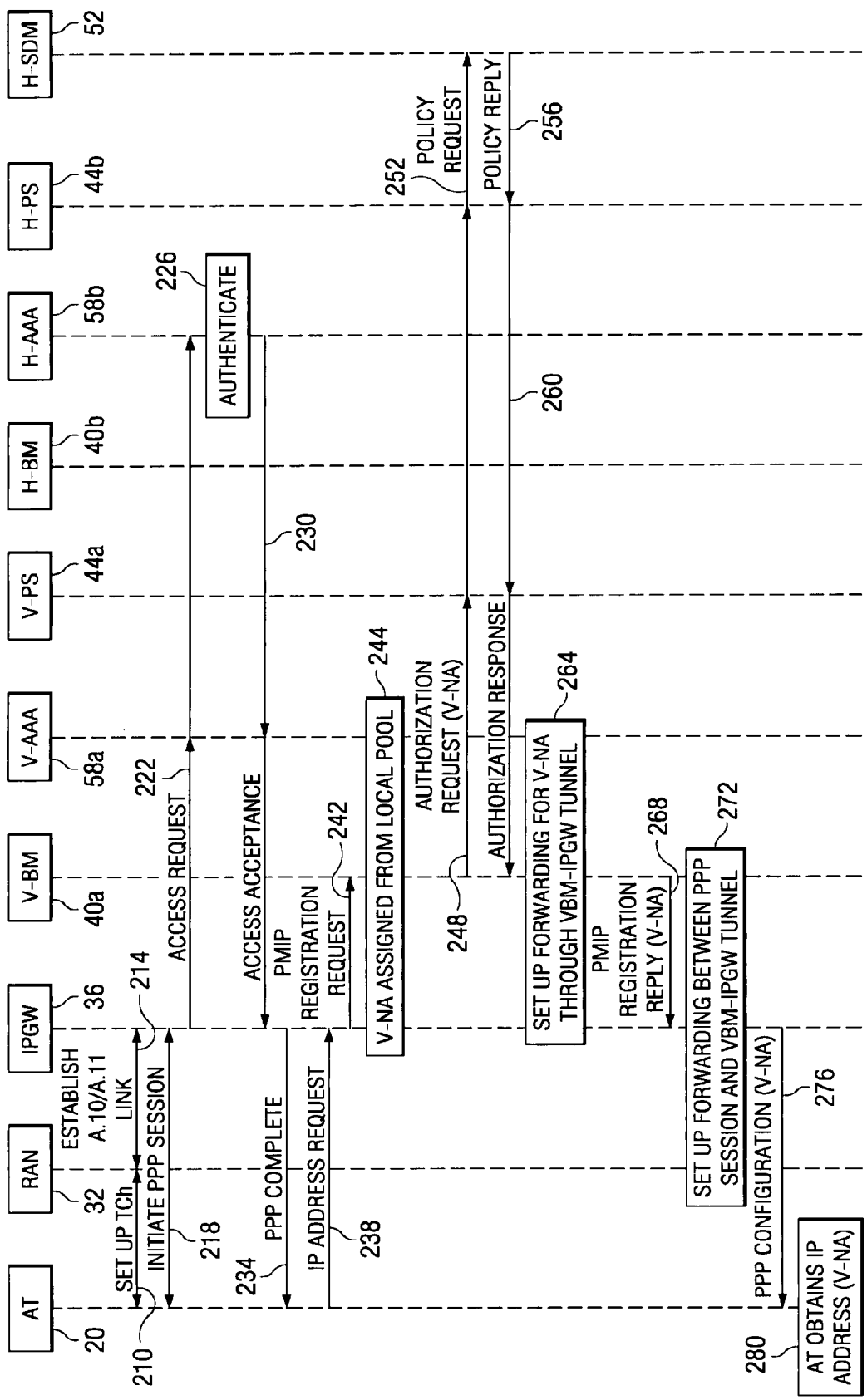
FIG. 4 illustrates one embodiment of a method for establishing a point-to-point session that may be used by the system of FIG. 1.

FIG. 4 illustrates one embodiment of a method for establishing a point-to-point session that may be used by system 10 of FIG. 1. The method begins at step 210, where a traffic channel (TCh) is set up to authenticate access terminal 20. The traffic channel may be set up as access terminal 20 powers up. Access terminal 20 may be provisioned with a network access identifier (NAI), a mobile node-authentication, authorization, and accounting (MN-AAA) security association, and a mobile node-home agent (MN-HA) security association. Radio access network initiates establishment of A.10/A.11 link 92 with IP gateway 36 at step 214.

Access terminal 20 initiates a point-to-point (PPP) session with IP gateway 36 at step 218. In the link control protocol (LCP) phase of the PPP establishment, Password Authentication Protocol (PAP) and/or Challenge Handshake Authentication Protocol (CHAP) may be used to authenticate access terminal 20.

IP gateway 36 sends an access request to visited AAA server 58a at step 222, which relays the access request to home AAA server 58b. Home AAA server 58b authenticates access terminal 20 at step 226. Home AAA server 58b sends an access acceptance to visited AAA server 58a at step 230, which forwards the access acceptance to IP gateway 36.

The access acceptance may include authorization parameters inserted by home AAA server 58b and/or visited AAA server 58a. The parameters may describe resources assigned by servers 38. For example, home AAA server 58a may assign home bearer manager 44a for mobile IP service, and visited AAA server 58a may assign visited bearer manager 40a and visited policy server 44a. In one embodiment, the access request and access acceptance may conform to the Remote Authentication Dial In User Service (RADIUS) protocol.

IP gateway 36 informs access terminal 20 that the PPP session has been established at step 234. Access terminal 20 sends an IP address request to IP gateway 36 at step 238. The address request may be sent during the IP Control Protocol (IPCP) phase of the PPP establishment. IP gateway 36 sends a Proxy Mobile IP (PMIP) registration request to visited bearer manager 40a at step 242. The registration request may indicate that the care of address is IP gateway 36 and that the agent is visited bearer manager 40a, and may be protected by an MN-HA security association.

Visited bearer manager 40a authenticates the registration request and assigns a visited network address (V-NA) from a visited network address pool at step 244. Visited bearer manager 40a sends an authorization request that includes the visited network address to visited policy server 44a at step 248. Visited policy server 44a forwards the authorization request to home policy server 44b.

Home policy server 44b sends a policy request to services data manager 52 at step 252. The policy request requests the policy corresponding to access terminal 20. Services data manager 52 sends the requested policy to home policy server 44b in a policy reply at step 256. Home policy server 44b sends an authorization response to visited policy server 44a at step 260. The authorization response includes the policy. Visited policy server 44a may add its own policy before forwarding the authorization response to visited bearer manager 40b. In one embodiment, the authorization request and authorization response may conform to the Diameter protocol.

Visited bearer manager 40a sets up forwarding for visited network address through VBM-IPGW tunnel 88 at step 264. Visited bearer manager 40 may create a mobility binding entry for access terminal 20 to set up forwarding. Visited bearer manager 40a sends a PMIP registration reply to IP gateway 36 at step 268. The registration reply may include the visited network address as the home address, and may be protected by an MN-HA authentication extension.

IP gateway 36 sets up forwarding between the PPP session and the VBM-IPGW tunnel 88 at step 272. IP gateway 36 sends the visited network address to access terminal 20 in an PPP configuration message at step 276. Access terminal 20 obtains the visited network address at step 280. Access terminal 20 may use the visited network address to communicate packets along visited anchored path 82.

Modifications, additions, or omissions may be made to the method without departing from the scope of the invention. The method may include more, fewer, or other steps. Additionally, steps may be performed in any suitable order.

Figure 5:
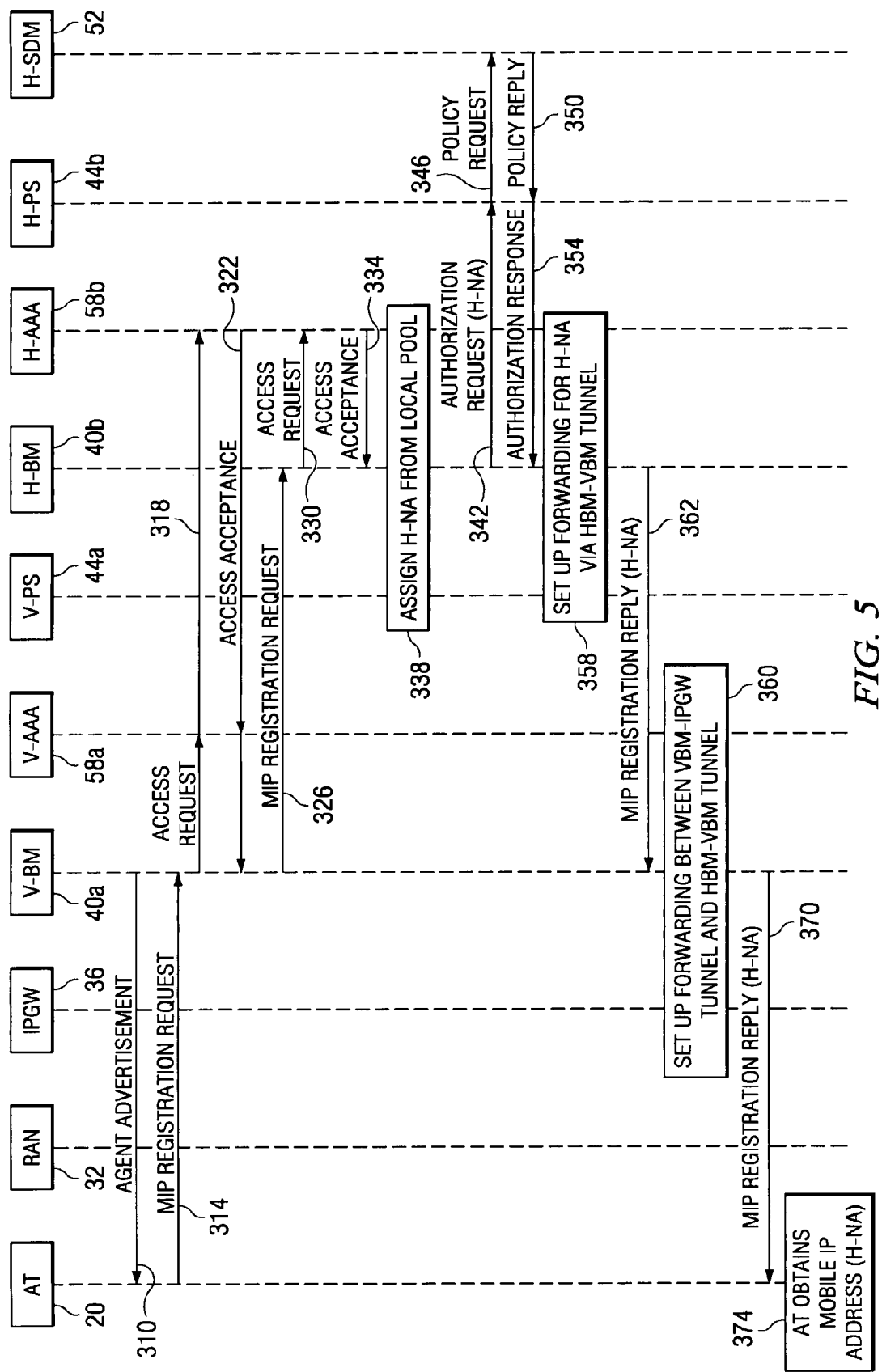
FIG. 5 illustrates one embodiment of a method for establishing a mobile Internet Protocol (IP) session that may be used by the system of FIG. 1.

FIG. 5 illustrates one embodiment of a method for establishing a mobile IP session that may be used by system 10 of FIG. 1. The method begins at step 310, where visited bearer manager 40a sends an agent advertisement to IP gateway 36, which forwards the agent advertisement to access terminal 20.

Access terminal 20 sends a mobile IP (MIP) registration request to visited bearer manager 40a at step 314. The message may include a mobile node-foreign agent (MN-FA) challenge extension, a mobile node-home agent (MN-HA)

authentication extension, and a mobile node-AAA (MN-AAA) authentication extension.

Visited bearer manager 40a processes the registration request and maps the MN-FA challenge extension and MN-AAA authentication extension to an access request. Visited bearer manager 40a sends an access request to visited AAA server 58a at step 318, which forwards the access request to home AAA server 58b. Home AAA server 58b authenticates access terminal 20 and sends an access acceptance to visited AAA server 58a at step 322, which forwards the access acceptance to visited bearer manager 40a. The access acceptance may include authorization attributes from both the visited and home AAA servers 58.

Visited bearer manager 40a relays the registration request to home bearer manager 40b at step 326. In another embodiment, if access terminal 20 knows home bearer manager 40b, access terminal 20 may send the registration request directly to the home bearer manager 40b, which forwards the registration request to home AAA server 58b.

Home bearer manager 40b processes the registration request, and sends an access request to home AAA server 58b at step 330. Home AAA server 58b sends an access acceptance to home bearer manager 40b at step 334. The access acceptance may include authorization attributes for home agent service. Home bearer manager 40b assigns a home network address (H-NA) from a local address pool at step 338.

Home bearer manager 40b may authenticate the registration request according to the MN-HA security association, and then sends an authorization request to home policy server 44b at step 342. Home policy server 44b sends a policy request to services data manager 52 at step 346. The policy request requests the policy corresponding to access terminal 20. Services data manager 52 sends the requested policy in a policy reply at step 350. Home policy server 44b sends an authorization response with the policy to home bearer manager 40b at step 354. The authorization response includes the address for applications manager 56 assigned to access terminal 20 for SIP service.

Home bearer manager 40b sets up forwarding for home network address through HBM-VBM tunnel 86 at step 358. Home bearer manager 40b may create a mobility binding entry for access terminal 20 to create HBM-VBM tunnel 86. Home bearer manager 40b sends a registration reply to visited bearer manager 40a at step 362. The registration reply includes the assigned home network address.

Visited bearer manager 40a sets up forwarding between VBM-IPGW tunnel 88 and HBM-VBM tunnel 86 at step 360. Visited bearer manager 40a relays the mobile IP registration reply to access terminal 20 at step 370. The registration reply includes the home network address. Access terminal obtains the home network address as the mobile IP address at step 374. Access terminal 20 may use the home network address to communicate packets along home anchored path 80.

To re-register, access terminal 20 may send a re-registration request to visited bearer manager 40a, which forwards the request to home bearer manager 40b. The re-registration request may be a mobile IP registration request that includes the home network address and the visited network address. Home bearer manager 40b updates the mobility binding for access terminal 20. Home bearer manager 40b then sends a registration reply to visited bearer manager 40a, which updates the visitor entry for access terminal 20. Visited bearer manager 40b then sends the registration reply to access terminal 20, which updates its registration state.

To deregister, access terminal 20 sends deregistration request to visited bearer manager 40a, which forwards the request to home bearer manager 40b. The deregistration request may comprise a registration request with a lifetime of zero. Home bearer manager 40b deletes the mobility binding for access terminal 20, and sends a registration reply to visited bearer manager 40b. Visited bearer manager 40b deletes the visitor entry for access terminal 20. Visited bearer manager 40b then sends a registration reply to access terminal 20, which deletes its registration state.

Modifications, additions, or omissions may be made to the method without departing from the scope of the invention. The method may include more, fewer, or other steps. Additionally, steps may be performed in any suitable order.

Certain embodiments of the invention may provide one or more technical advantages. A technical advantage of one embodiment may be that packets from an access terminal can be communicated along a home anchored path or a visited anchored path. The home anchored path includes a home bearer manager of the home network of the access terminal and may include a visited bearer manager of the visited network. The visited anchored path includes the visited bearer manager, but not the home bearer manager.

Another technical advantage of one embodiment may be that the access terminal can be provided with a home network address and a visited network address. The home network address may be used to communicate packets along the home anchored path, and the visited network address may be used to communicate packets along the visited anchored path.

Another technical advantage of one embodiment may be that a home policy server of the home network may provide policy rules to a visited policy server of the visited network. The policy rules may be used to enforce policies for packets sent along the visited anchored path.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

What is claimed is:

1. A method for communicating a plurality of packets along a bearer path, comprising:

assigning a home network address from a local address pool to an access terminal, the home network address allowing the access terminal to access a home anchored bearer path anchored at a home network of the access terminal, the home anchored bearer path including a home bearer manager and a visited bearer manager;

assigning a visited network address from a visited address pool to the access terminal, the visited network address allowing the access terminal to access a visited anchored bearer path anchored at a visited network, the visited anchored bearer path distinct from the home anchored bearer path and including the visited bearer manager;

providing both the home network address and the visited network address to the access terminal;

providing one or more routing rules to the access terminal, a routing rule instructing the access terminal when to use the home anchored bearer path and when to use the visitor anchored bearer path, at least one routing rule of the one or more routing rules instructing the access terminal to:

route signaling using the home anchored bearer path; and route media using the visitor anchored bearer path if the visitor anchored bearer path provides sufficient security and using the home anchored bearer path if the visitor anchored bearer path provides insufficient security;

receiving the plurality of packets from the access terminal, the access terminal sending packets using the home network address to direct packets along the home anchored bearer path or the visited network address to direct packets along the visited anchored bearer path according to the routing rules;

communicating the plurality of packets along the home anchored bearer path if the plurality of packets use the home network address; and communicating the plurality of packets along the visited anchored bearer path if the plurality of packets use the visited network address.

2. The method of claim 1, wherein providing the home network address further comprises:

receiving the home network address from the home network; and sending the home network address to the access terminal.

3. The method of claim 1, further comprising:

creating a mobility entry to set up communication along the visited anchored bearer path using the visited network address.

4. The method of claim 1, wherein communicating the plurality of packets along the visited anchored bearer path further comprises:

communicating the plurality of packets along the visited anchored bearer path if the packets use the visited network address as a care-of address.

5. The method of claim 1, further comprising:

receiving a re-registration request comprising the home network address and the visited network address;

forwarding the re-registration request to the home network;

receiving a registration reply from the home network; and updating a visitor entry corresponding to the access terminal.

6. The method of claim 1, further comprising:

receiving a deregistration request comprising the home network address and the visited network address;

forwarding the deregistration request to the home network;

receiving a registration reply from the home network; and deleting a visitor entry corresponding to the access terminal.

7. A bearer manager for communicating a plurality of packets along a bearer path, comprising:

a memory operable to:

store a home network address assigned from a local address pool, the home network address allowing the access terminal to access a home anchored bearer path anchored at a home network of an access terminal, the home anchored bearer path including a home bearer manager and a visited bearer manager; and store a visited network address assigned from a visited address pool, the visited network address allowing the access terminal to access a visited anchored bearer path anchored at a visited network, the visited anchored bearer path distinct from the home anchored bearer path and including the visited bearer manager; and a processor in communication with the memory and operable to:

provide the home network address and the visited network address to the access terminal;

provide one or more routing rules to the access terminal, a routing rule instructing the access terminal when to use the home anchored bearer path and when to use the visitor anchored bearer path, at least one routing rule of the one or more routing rules instructing the access terminal to:

route signaling using the home anchored bearer path; and route media using the visitor anchored bearer path if the visitor anchored bearer path provides sufficient security and using the home anchored bearer path if the visitor anchored bearer path provides insufficient security;

receive the plurality of packets from the access terminal, the access terminal sending packets using the home network address to direct packets along the home anchored bearer path or the visited network address to direct packets along the visited anchored bearer path according to the routing rules;

communicate the plurality of packets along the home anchored bearer path if the plurality of packets use the home network address; and communicate the plurality of packets along the visited anchored bearer path if the plurality of packets use the visited network address.

8. The bearer manager of claim 7, the processor further operable to provide the home network address by:

receiving the home network address from the home network; and sending the home network address to the access terminal.

9. The bearer manager of claim 7, the processor further operable to:

create a mobility entry to set up communication along the visited anchored bearer path using the visited network address.

10. The bearer manager of claim 7, the processor further operable to communicate the plurality of packets along the visited anchored bearer path by:

communicating the plurality of packets along the visited anchored bearer path if the packets use the visited network address as a care-of address.

11. The bearer manager of claim 7, the processor further operable to:

receive a re-registration request comprising the home network address and the visited network address;

forward the re-registration request to the home network;

receive a registration reply from the home network; and update a visitor entry corresponding to the access terminal.

12. The bearer manager of claim 7, the processor further operable to:

receive a deregistration request comprising the home network address and the visited network address;

forward the deregistration request to the home network;

receive a registration reply from the home network; and delete a visitor entry corresponding to the access terminal.

13. Logic for communicating a plurality of packets along a bearer path, the logic embodied in a non-transitory computer-readable storage medium and when executed by a processor performs a method configured to:

assign a home network address from a local address pool to an access terminal, the home network address allowing the access terminal to access a home anchored bearer path anchored at a home network of the access terminal, the home anchored bearer path including a home bearer manager and a visited bearer manager;

assign a visited network address from a visited address pool to the access terminal, the visited network address allowing the access terminal to access a visited anchored bearer path anchored at a visited network, the visited anchored bearer path distinct from the home anchored bearer path and including the visited bearer manager;

provide both the home network address and the visited network address to the access terminal;

provide one or more routing rules to the access terminal, a routing rule instructing the access terminal when to use the home anchored bearer path and when to use the visitor anchored bearer path, at least one routing rule of the one or more routing rules instructing the access terminal to:

route signaling using the home anchored bearer path; and route media using the visitor anchored bearer path if the visitor anchored bearer path provides sufficient security and using the home anchored bearer path if the visitor anchored bearer path provides insufficient security;

receive the plurality of packets from the access terminal, the access terminal sending packets using the home network address to direct packets along the home anchored bearer path or the visited network address to direct packets along the visited anchored bearer path according to the routing rules;

communicate the plurality of packets along the home anchored bearer path if the plurality of packets use the home network address; and communicate the plurality of packets along the visited anchored bearer path if the plurality of packets use the visited network address.

14. The logic of claim 13, further operable to provide the home network address by:

receiving the home network address from the home network; and sending the home network address to the access terminal.

15. The logic of claim 13, further operable to:

create a mobility entry to set up communication along the visited anchored bearer path using the visited network address.

16. The logic of claim 13, further operable to communicate the plurality of packets along the visited anchored bearer path by:

communicating the plurality of packets along the visited anchored bearer path if the packets use the visited network address as a care-of address.

17. The logic of claim 13, further operable to:

receive a re-registration request comprising the home network address and the visited network address;

forward the re-registration request to the home network;

receive a registration reply from the home network; and update a visitor entry corresponding to the access terminal.

18. The logic of claim 13, further operable to:

receive a deregistration request comprising the home network address and the visited network address;

forward the deregistration request to the home network;

receive a registration reply from the home network; and delete a visitor entry corresponding to the access terminal.

19. A system for communicating a plurality of packets along a bearer path, comprising:

means for assigning a home network address from a local address pool to an access terminal, the home network address allowing the access terminal to access a home anchored bearer path anchored at a home network of the access terminal, the home anchored bearer path including a home bearer manager and a visited bearer manager;

means for assigning a visited network address from a visited address pool to the access terminal, the visited network address allowing the access terminal to access a visited anchored bearer path anchored at a visited network, the visited anchored bearer path distinct from the home anchored bearer path and including the visited bearer manager;

means for providing both the home network address and the visited network address to the access terminal;

means for providing one or more routing rules to the access terminal, a routing rule instructing the access terminal when to use the home anchored bearer path and when to use the visitor anchored bearer path, at least one routing rule of the one or more routing rules instructing the access terminal to:

route signaling using the home anchored bearer path; and route media using the visitor anchored bearer path if the visitor anchored bearer path provides sufficient security and using the home anchored bearer path if the visitor anchored bearer path provides insufficient security;

means for receiving the plurality of packets from the access terminal, the access terminal sending packets using the home network address to direct packets along the home anchored bearer path or the visited network address to direct packets along the visited anchored bearer path according to the routing rules;

means for communicating the plurality of packets along the home anchored bearer path if the plurality of packets use the home network address; and means for communicating the plurality of packets along the visited anchored bearer path if the plurality of packets use the visited network address.

20. The method of claim 1, the assigning the visited network address further comprising:

assigning the visited network address according to a proxy mobile interne protocol.

* * * * *